United States Patent
Li et al.

(10) Patent No.: US 9,971,655 B1
(45) Date of Patent: May 15, 2018

(54) PRIMED APPLICATION RECOVERY

(71) Applicant: EMC IP Holding Company LLC, Hopkinton, MA (US)

(72) Inventors: Junxu Li, Pleasanton, CA (US); Adam Brenner, Lake Forest, CA (US); Erik Hansen, Mission Viejo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 100 days.

(21) Appl. No.: 15/196,152

(22) Filed: Jun. 29, 2016

(51) Int. Cl.
*G06F 11/00* (2006.01)
*G06F 11/14* (2006.01)

(52) U.S. Cl.
CPC ...... *G06F 11/1451* (2013.01); *G06F 11/1438* (2013.01); *G06F 11/1469* (2013.01); *G06F 2201/805* (2013.01); *G06F 2201/84* (2013.01)

(58) Field of Classification Search
CPC ............ G06F 11/1402; G06F 11/1458; G06F 11/1469
USPC .......................................................... 714/15
See application file for complete search history.

(56) References Cited

U.S. PATENT DOCUMENTS

| | | | |
|---|---|---|---|
| 9,092,376 B1* | 7/2015 | Chelur | G06F 17/30088 |
| 2005/0028026 A1* | 2/2005 | Shirley | G06F 11/1469 |
| | | | 714/6.3 |
| 2006/0020858 A1* | 1/2006 | Schaefer | G06F 11/0715 |
| | | | 714/38.1 |
| 2006/0288419 A1* | 12/2006 | Wang | G06F 11/1435 |
| | | | 726/24 |
| 2010/0115334 A1* | 5/2010 | Malleck | G06F 9/485 |
| | | | 714/15 |
| 2011/0225123 A1* | 9/2011 | D'Souza | G06F 17/30312 |
| | | | 707/634 |
| 2013/0024722 A1* | 1/2013 | Kotagiri | G06F 11/1004 |
| | | | 714/6.1 |
| 2015/0186044 A1* | 7/2015 | Sharma | G06F 3/065 |
| | | | 711/162 |
| 2015/0205280 A1* | 7/2015 | Tsuchiya | G05B 19/0421 |
| | | | 700/20 |

* cited by examiner

*Primary Examiner* — Chae M Ko
(74) *Attorney, Agent, or Firm* — Staniford Tomita LLP

(57) ABSTRACT

A recipe is stored for an application where the recipe specifies parameters and actions for restoring, shutting down, and backing up the application. A snapshot backup of the application is copied from a backup system to a recovery system where the application is restored according to the recipe. After the application is restored, the application is shutdown. While the application is shutdown, the application is backed up to create an application-consistent backup of the application.

20 Claims, 9 Drawing Sheets

PRIMED APPLICATION RECOVERY

TECHNICAL FIELD

Embodiments are generally directed to networked-based data protection methods, and more specifically to data recovery.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Traditionally, applications are protected by copying or snapshotting a physical system, virtual machine, container, or logical unit number (LUN) with very little thought to the complexity of restoring a particular application and its associated data. In the event an application recovery from backup is necessary, this is typically a complex and manual operation that is very time-consuming and prone to errors. Further, there is very little visibility into whether recovery of a backup will meet service level objectives (SLOs).

Many backup techniques allow for backing up an application without having to shut the application down. This allows an organization to continue operations during a backup with little impact. However, these types of backups can be subject to numerous errors and data integrity issues and can also require a very long time (e.g., many hours) to recover. Therefore, there is a need to better prepare backups in order to facilitate the recovery process should the need arise. There is a need to collect and measure metrics to ensure that a recovery, if needed, will meet the SLO.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
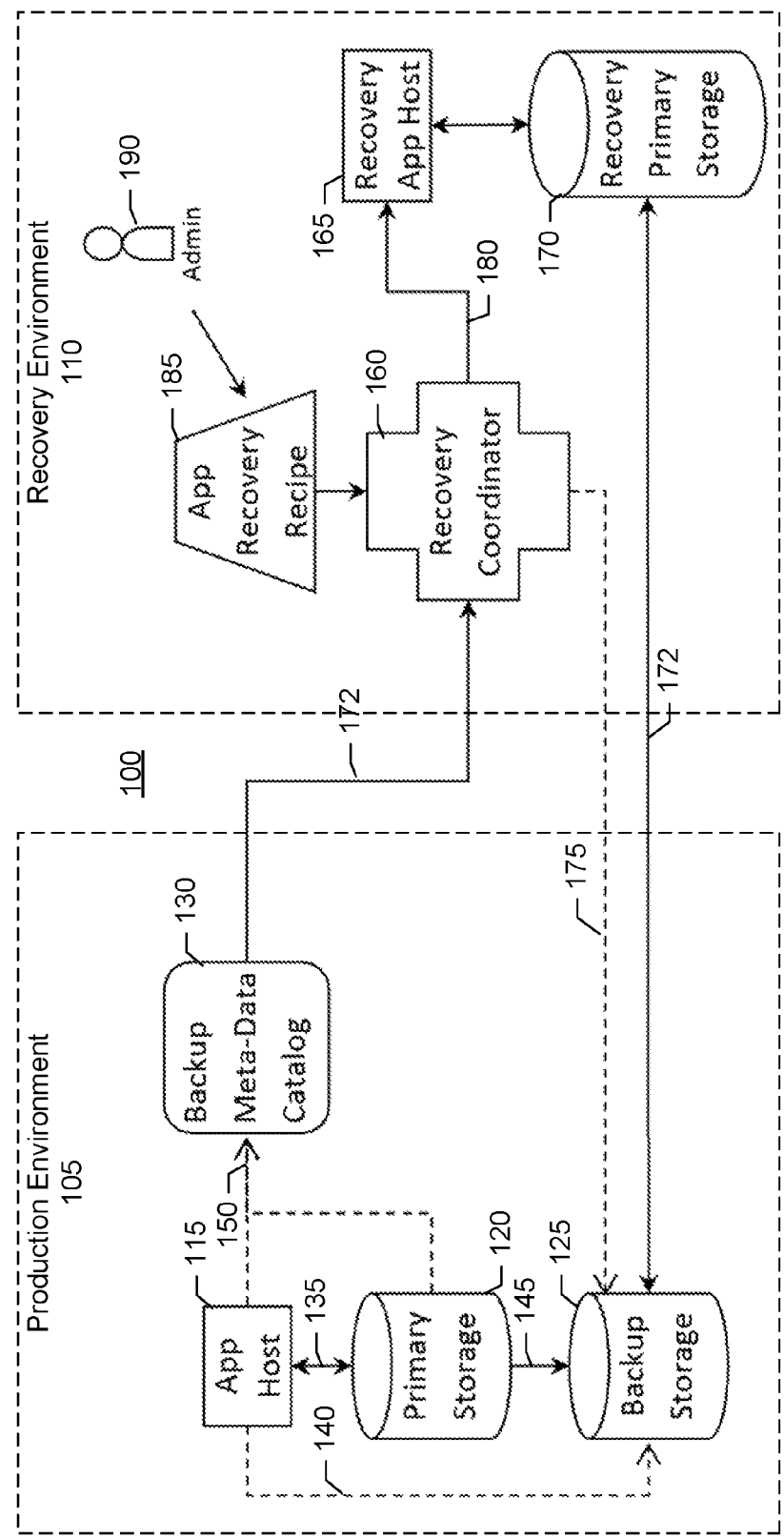
FIG. 1 is a diagram of a production and recovery environment, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer (e.g., processor of the computer), the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for facilitating the recovery of data that has been backed up that can be used as part of a disaster recovery solution for large-scale networks. Some embodiments of the invention involve automated backup and recovery techniques in a distributed system, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a simplified block diagram of a computing environment 100 that implements one or more embodiments of a system for facilitating a recovery of a backup. In the example shown in FIG. 1, there is a production environment or system 105 and a recovery environment or system 110. The production environment includes a host computer 115 and primary storage 120. The production environment further includes a backup system including backup storage 125 and backup meta-data catalog 130.

The production environment includes the processes, hardware, and software for the real-time staging and execution of programs that run an organization's day-to-day operations. For example, the host computer may host an application program that provides services to an organization's outside customers, internal customers, or other users. The application may include a web application, an e-commerce application, enterprise resource planning (ERP) application, supply chain management application, or customer relationship management (CRM) application, among others.

In a specific embodiment, the application program includes a database program (e.g., Oracle as provided by Oracle Corporation of Redwood Shores, Calif. or Microsoft SQL Server as provided by Microsoft Corporation of Redmond, Wash.). Other examples of application programs include web servers (e.g., Apache, Microsoft Internet Information Server (ITS)), communication programs or email and calendaring programs (e.g., Microsoft Exchange Server), collaboration software, development tools, and others. Data generated by the application program may be stored and retrieved 135 from the primary storage.

The backup system includes a backup application which is responsible for backing up the applications and corresponding data in the production environment. Depending upon the type of application and location of data, a backup 140 may be from the application host to the backup storage. Instead or additionally, a backup 145 may be from the primary storage to the backup storage. Metadata associated with the backup, whether from the application host, the primary storage, or both is written 150 to the backup metadata catalog. The metadata may include, for example, a time and date of a backup, information identifying a source of the backup, information identifying a location of the backup, type of backup performed (e.g., full backup, incremental backup, snapshot backup), and so forth.

The recovery environment or system includes a recovery coordinator 160, a recovery host computer 165, and recovery primary storage 170. The recovery coordinator is responsible for obtaining 172 a backup of an application from the backup system and performing a mock restore 180 to the recovery system. In other words, the backup is not restored to a production system or environment. In an embodiment, the recovery coordinator issues 175 a message to the backup storage to initiate a recovery to the recovery primary storage. The recovery coordinator can monitor the mock restore and gather metrics associated with the recovery of the application to the application recovery host and recovery primary storage.

The mock restore allows for any issues in the backup to be identified and addressed before recovering from a backup is actually needed. Such issues may include, for example, validation, data corruption, missing data, and so forth. In an embodiment, the recovery coordinator facilitates the generation of an application recovery recipe 185. Details for the recipe may be provided by an administrator 190. The administrator can create a recipe that describes how the recovery of a particular application should occur. This includes, for example, the recovery steps and order in which the steps should be executed.

In an embodiment, the recipe provides a data structure for storing a set of parameters, values, actions, and sequence of actions for, among other things, properly restoring a particular application. The recipe may store a procedure or set of procedures performed or executed by a processor-based system, such as by a program, subroutine or other software process. The recipe is processed by the recovery coordinator so that the recovery of the application is automatic. In a specific embodiment, the backup obtained by the recovery coordinator from the backup system is a snapshot backup. The snapshot backup may be a crash-consistent backup. Aspects and principles of the system, however, can be applied to other types of backups such as full backups or application-consistent backups.

Backups are critical to ensuring business continuity when a disaster or other disruptive event occurs. Backups, however, can be very disruptive to an organization because of the expectation that services be available "24/7," i.e., available any time and every day. Throughout the day, an organization may generate a vast amount of data that may require large amounts of computing resources and time to properly backup. In a complex environment that includes many different users, there may be writes to the data while it is being backed up. This can result in data corruption or backups in which data is missing. But, for many organizations, pausing operations so that a backup can be performed is simply not tenable.

Thus, many organizations have turned to snapshots or snapshot backups as a way to perform backups. A snapshot includes a set of reference markers or pointers to data stored on a storage device (e.g., disk drive, disk array, storage array, or storage area network (SAN)). A snapshot can provide a state of the system or a virtual copy of data at a particular point-in-time, e.g., time the snapshot was taken.

Figure 2:
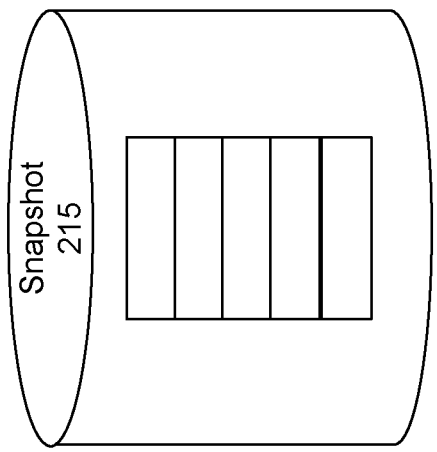
FIG. 2 shows a source and a snapshot of the source.
Figure 2:
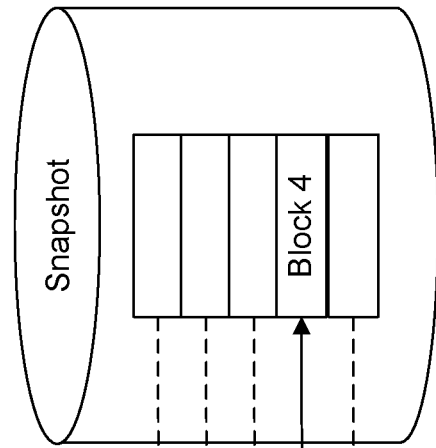
Figure 3:
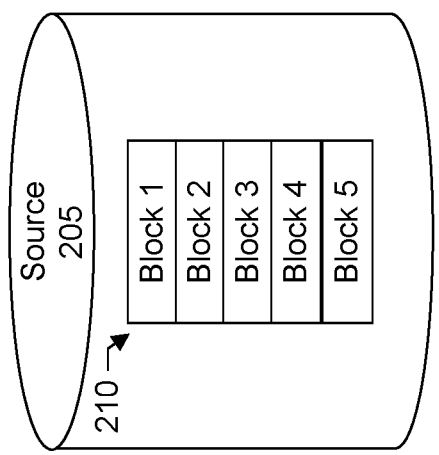
FIG. 3 shows the source and the snapshot after a change to the source.
Figure 3:
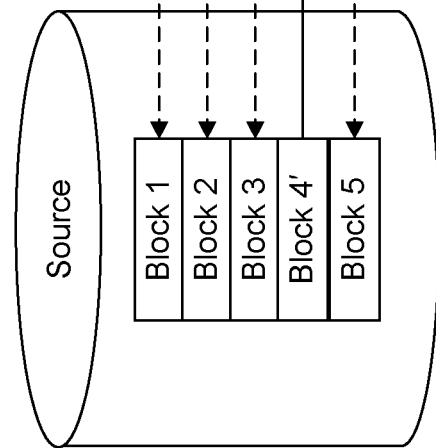

For example, FIGS. 2 and 3 show an example of a snapshot operation. FIG. 2 shows a source 205 such as a source database which includes a set of blocks 210 in which data may be stored. In a snapshot backup, a region on storage may be set aside for a snapshot 215. Referring now to FIG. 3, when a block on the source is changed, the original data in the block may be copied to the snapshot. For example, in FIG. 3, a fourth block in the source has been changed as indicated by "block 4'" and the original data in the block has been written 320 to the snapshot as indicated by "block 4." The snapshot can be accessed to provide a view of the system at the time the snapshot was taken. More particularly, in this example, the snapshot may store the original data from the fourth block and include pointers 325 to the unchanged blocks (e.g., first, second, third, and fifth data blocks) on the source. There are many different types of snapshot backup systems and methods such as copy-on-write (COW), redirect-on-write, clone or split mirror, and others.

Snapshots are attractive as backup solutions because they can be created very quickly while the application is still running (or with little disruption to the application) as a snapshot is a virtual copy of the data and not the actual copy. For example, it can be much faster to designate an area on disk for a snapshot and use pointers to data as compared to copying the entire actual source data. When the need arises, however, to recover an application from a snapshot backup of the application, the recovery can be a very lengthy, time-consuming, error-prone, and complex process depending upon the type of application.

Some applications such as database applications have very complex structures and processes for managing, accessing, and storing data. Specifically, a database application may maintain various different types of files for the database such as journals or log files of transactions yet to be committed to the database. A snapshot of a database made while the database is running will generally not include transactions stored in open files, uncommitted log files, pending I/O operations, and so forth. The snapshot backup of the database may not capture such pending I/O operations, data cached in memory, uncommitted transactions, open files, and so forth. Snapshot backups may be considered crash-consistent backups because the backup method is equivalent to restoring to the exact moment before a crash.

In other words, traditionally applications are protected by copying or snapshotting a physical system, virtual machine, container, or logical unit number (LUN) with very little thought to the complexity of restoring a particular application and its associated data. In the event an application recovery from backup is necessary, this is typically a complex and manual operation of restoring the machine environment, the application, and any associated data. After restoring raw data from backup, there may be a need to repair the restored data—such as with databases that maintain transaction logs. In an embodiment, an application recovery process is provided whereby an application and its associated data are automatically prepared for a quicker and more consistent restore after backup.

In an embodiment, the backup application performs any application-specific tasks and persists a copy of the application data on protection storage or creates a snapshot of the data. Information about the runtime environment and configuration is also collected. If the application is already in a container or virtual machine, an image copy of such data can be preserved. Once an application backup has completed, the recovery coordinator performs an automatic mock restore on a secondary system. The recovery coordinator performs recovery functions (e.g., play back transaction logs on a database, run a file system check, etc.) to bring the application to a consistent state. Additional validation can be performed to ensure recovery and application integrity is guaranteed in the event a recovery is needed. Since it is a dormant application instance—there are no live transactions taking place at the time of recovery—it can be properly shut down and all application data persisted for the fastest, most consistent startup possible. The prepared restore can then be either left on secondary hardware as a ready failover, backed up as a later copy than the original, or both.

If the application has other dependencies, then those dependencies can be resolved to a proper state first. Also, in order to facilitate remote site failover and disaster recovery, multiple copies of application data can be generated at different sites through a replication process, and certain policies can be instituted to govern activation priorities. This will ensure protected applications are fully ready for start-up without a lengthy recovery process and the uncertainties associated with it. Additional metadata describing the application runtime environment may be collected at the time of backup. Such information can be used to re-build the environment for application data validation. Collecting the metadata can be achieved by traversing the backed up file system, by scanning the file system device blocks, or both. Both metadata and backups may use de-duplication technology for efficient space-savings. In an embodiment, systems and techniques are provided for an improved process of application restore by performing post data protection actions to ensure an application can be restored with predictability and validated results.

Figure 4:
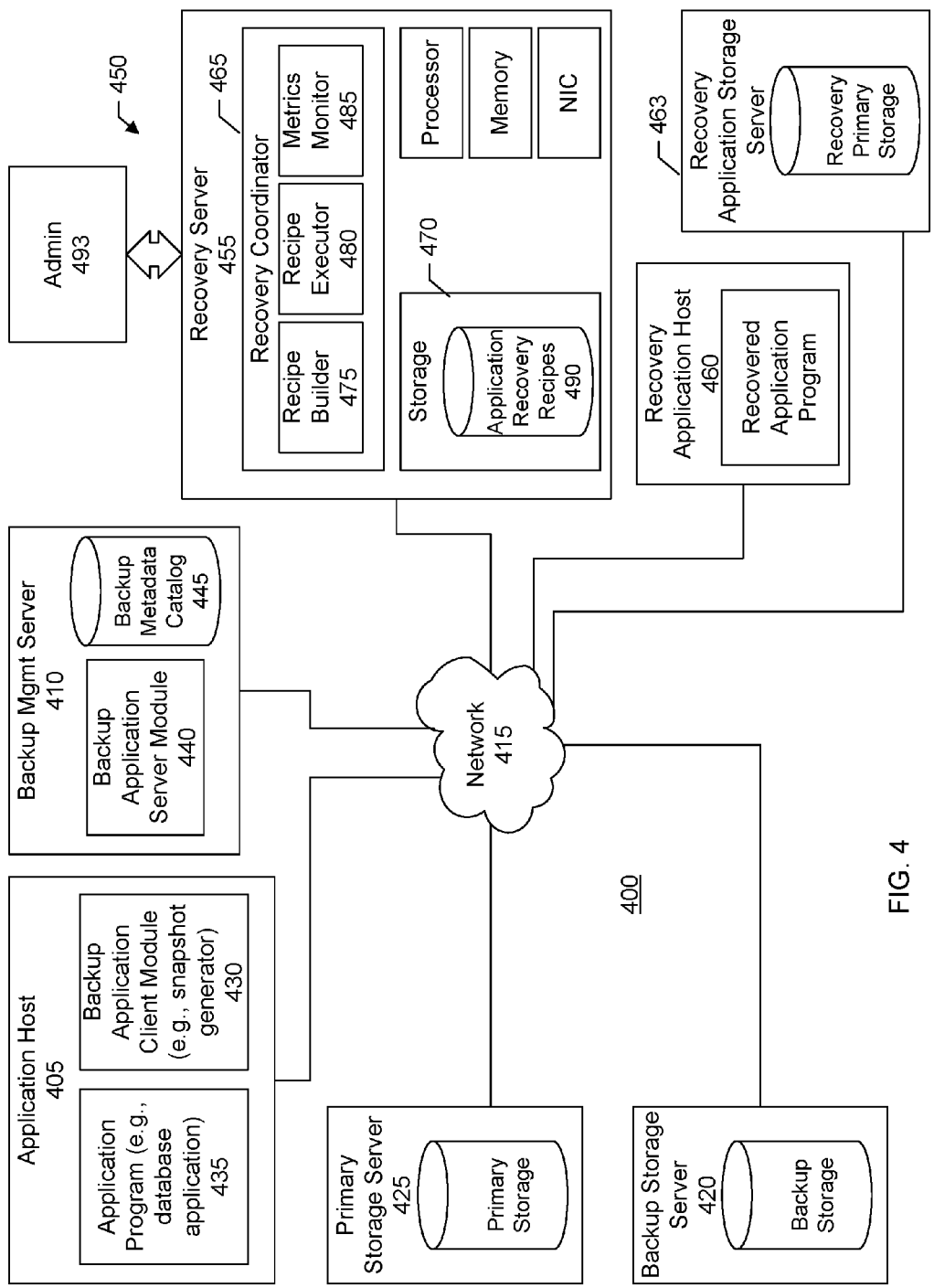
FIG. 4 is a diagram of a large-scale network implementing a system for primed application recovery, under some embodiments.

FIG. 4 shows a more detailed block diagram of the system shown in FIG. 1. FIG. 4 illustrates a computer network system 400 that implements one or more embodiments of a system for backing up and restoring data. In system 400, a number of clients 405 are provided to serve as backup clients, nodes, or hosts. A network or backup server computer 410 is coupled directly or indirectly to these clients through network 415, which may be a cloud network, LAN, WAN or other appropriate network. Network 415 provides connectivity to the various systems, components, and resources of system 400, and may be implemented using protocols such as Transmission Control Protocol (TCP) and/or Internet Protocol (IP), well known in the relevant arts.

In a distributed network environment, network 415 may represent a cloud-based network environment in which applications, servers and data are maintained and provided through a centralized cloud computing platform. In an embodiment, system 400 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 400 may be stored in a backup media of a backup storage node 420. The backup media may be located at any number of persistent storage locations and devices, such as local client storage, server storage, or network storage, which may at least be partially implemented through storage device arrays, such as RAID components. In an embodiment network 400 may be implemented to provide support for various storage architectures such as storage area network (SAN), network-attached Storage (NAS), or direct-attached storage (DAS) that make use of large-scale network accessible storage devices, such as large capacity tape or drive (optical or magnetic) arrays.

In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

For the embodiment of FIG. 4, network system 400 includes backup management server 410, one or more hosts 405 including primary storage 425 to be backed up, and backup storage node 420. A host includes a backup application client module 430 and an application program 435 that is to be backed up by the backup application to the backup storage node. The backup application client module coordinates with a backup application server module 440 to backup the host application and corresponding data on the primary storage server to the backup storage node. The backup manager server processes include processes to index the backups in a backup metadata catalog 445 such as identifying which savesets reside on which backup devices or volumes. The backup storage node executes processes for receiving backup information from the application host, writing data to the backup devices or volumes, sending tracking information to the backup management server to track the data written to the devices or volumes, and reading the data from the devices or volumes at the request of a host during a recovery or at the request of the recovery coordinator for a primed recovery.

In an embodiment, system 400 may represent a Data Domain Restorer (DDR)-based deduplication storage system, and a storage server or node having the backup media may be implemented as a DDR Deduplication Storage server provided by EMC Corporation. However, other similar backup and storage systems are also possible. System 400 may utilize certain protocol-specific namespaces that are the external interface to applications and include NFS (network file system) and CIFS (common internet file system) namespaces, as well as a virtual tape library (VTL) or DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 400 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

As discussed above, in an embodiment, the system includes a recovery system 450. The recovery system includes a recovery server 455, a recovery application host 460, and recovery primary storage 463.

The servers, hosts, or both shown in FIG. 4 can be general purpose computers with software and hardware. The hardware may include a processor, memory, storage (e.g., hard disk), input/output (I/O) controller, network interface, and other computing components, each of which may be interconnected by a bus architecture or any interconnection scheme.

The software may include an operating system, application programs, daemons, drivers, file system device drivers, file system libraries, code modules, and other software components. Examples of operating systems include the Microsoft Windows® family of operating systems (e.g., Windows Server), Linux, HP-UX, UNIX, Sun OS, Solaris, Mac OS X (e.g., Macintosh), Alpha OS, AIX, IRIX32, or IRIX64. Other operating systems may be used. Communications among the components may be via a communication protocol interface, messaging system, or application program interface (API).

The distributed computer network shown in FIG. 4 is merely illustrative of an embodiment and is not intended to limit the scope of the embodiment as recited in the claims. One of ordinary skill in the art would recognize other variations, modifications, and alternatives. For example, more than one server, host, or client system may be connected to the communication network. As another example, while the recovery application host is shown as a machine separate from the recovery server, the recovery host may instead be located on the recovery server such as within a virtual machine or container on the recovery server. A recovery may be to a physical host or even to the primary machine where the original backup occurred. The recovery target or destination is configurable by an administrator through the recovery recipe. Generally, it is desirable to stage the recovery to a machine different or separate from where the primary data is located so that computing resources in the production environment can be dedicated to servicing customer requests.

FIG. 4 shows several modules, components, or code components of the recovery system. More particularly, in an embodiment, the recovery server includes a recovery coordinator 465 and storage 470. The recovery coordinator executes processes for setting up the recovery application host. The setup includes configuring and validating the host to ensure that the host has the minimum requirements necessary—as specified in the recipe—to run the application and that the mappings to storage have been properly configured. It can be desirable to configure the recovery environment so that it matches or mimics the production environment. The flexibility provided by the recipe, however, allows the administrator to specify a recovery environment that is different from the production environment and thus allows the administrator to make judicious use of the computing resources that are available.

The recovery coordinator includes an application restore recipe builder 475, a recipe executor 480, and a restore metrics monitor 485. The storage includes a repository 490 storing application recovery recipes. It should be appreciated that the components and modules shown in FIG. 4 may be functional and there can be many different hardware configurations. For example, the recovery coordinator is a process. While the recovery coordinator is shown on a machine separate from the recovery host, in other embodiments, the recovery coordinator may instead reside on the recovery host.

Figure 5:
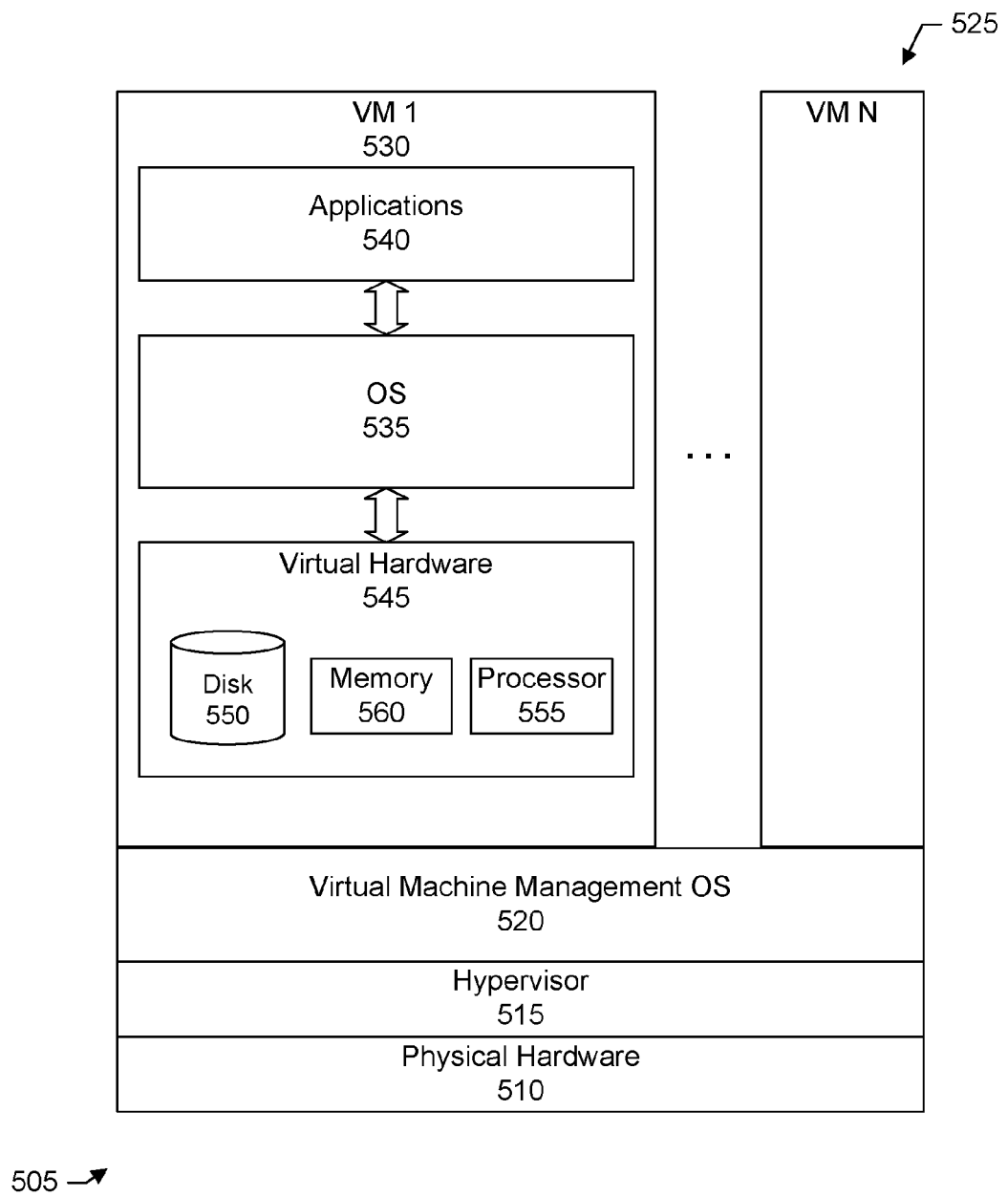
FIG. 5 shows a block diagram of a virtual machine environment.

The recovery application host and recovery primary storage provide a destination for the recovery of a backed up application by the recovery coordinator. For example, a backed up application may be restored a virtual environment hosted by the recovery application host. FIG. 5 shows one example of a virtual environment that may be referred to as a virtual machine.

In the example shown in FIG. 5, there is a host 505. The host includes physical hardware 510, virtualization software such as a hypervisor 515 and a virtual machine management operating system 520, and a set of virtual machines 525 that may be provisioned under the direction of the recovery coordinator.

The physical hardware may include a processor, storage, input/output (I/O) controller, network interface, and memory each of which may be interconnected by a bus architecture or any interconnection scheme. The host hosts any number of virtual machines (e.g., VM 1 . . . VM N). For example, there can be a single virtual machine or multiple virtual machines (e.g., two or more virtual machines). The host uses virtualization software to run the virtual machines or virtual devices. Generally, virtualization is an abstraction layer that allows multiple virtual environments to run in isolation, side-by-side on the same physical machine. A virtual machine (VM) is a software implementation of a machine (e.g., a computer) that executes programs like a physical machine. In other words, the virtual machine is a software abstraction of a physical computer system that is installed as a "guest" on a "host" hardware platform.

A virtual machine 530 may include a guest operating system 535, guest applications 540 running on the guest operating system, and virtual hardware 545 which represents a hardware state of the virtual machine. Virtual hardware refers to the hardware resources allocated to the virtual machine and is mapped to the hardware platform. The virtual hardware may include a virtual disk 550, virtual processor 555, virtual system memory 560, and various virtual devices for which the guest OS, virtual machine management OS, or both includes corresponding drivers. Virtual devices may include, for example, a virtual graphics adapter, a virtual network adapter, a virtual input/output (I/O) device, or the like. Each virtual machine may be assigned an identifier such as an Internet Protocol (IP) address, globally unique identifier (GUID), or both. The guest applications may include an application backed up by a backup application and recovered by the recovery coordinator.

Another example of a virtual environment includes a container. In a container environment, different containers may share the same operating system, binary files, and libraries. Two or more containers may share the same operating system, kernel instance, network connection and base file system, and each instance of the application may run within a separate user space. The sharing helps to reduce CPU usage and overhead associated with running multiple operating systems as compared to a virtual machine which runs not only a full copy of an operating system, but a virtual copy of all the hardware that the operating system needs to run. A virtual machine, however, can provide a higher level of isolation and flexibility to run different applications and operating systems as compared to a container. Depending upon factors such as the type of application to be recovered, available computing resources, and other factors a virtual machine or container may be desirable.

Referring back now to FIG. 4, application recovery recipes are managed by the recipe builder. In an embodiment, the recipe builder provides an interface for an administrator 493 to create, edit, update, and maintain application recovery recipes. The administrator would typically be a person who is familiar with the various processes, commands, scripts, and so forth that a particular application may have for recovery, startup, validation, and shutdown. The interface may include a graphical user interface (GUI), command line interface, programmatic interface (e.g., application programming interface or API, REST API), or combinations of these. A recipe may, for example, be a file that is uploaded to the recovery coordinator. For example, the builder interface may include a browse button that the administrator can click to locate and select a recipe file for uploading to the recovery coordinator.

In an embodiment, a recipe includes an application-specific listing of parameters and a sequence of actions for recovering a particular application that has been backed up via a snapshot, starting the application, initiating and validating consistency, running application-specific procedures to check the functional correctness of the application to safeguard against logical errors, data corruption, or both, shutting down the particular application after the application is recovered and validated, and backing up the particular application while it is shutdown.

Shutting down the application after the application has been recovered allows the application to properly close open files, complete transactions that were pending at the time of the snapshot backup, and so forth. Backing up the application after or while the application is shutdown allows for creating an application-consistent backup of the application. Restoring from an application-consistent backup is much faster than restoring from a snap-consistent or crash-consistent backup. Further, issues such as data inconsistencies, validation errors, data corruption, and so forth are much less likely to occur when restoring from an application-consistent backup as compared to a crash-consistent or snap-consistent backup.

A recipe for recovering a particular application may be different from another recipe for recovering another different application. In other words, a first recipe for recovering a first application may include a different set of parameters, actions, sequence of actions, or combinations of these for recovering a first application as compared to a second recipe for recovering a second application. For example, a recipe for recovering an Oracle database may be different from a recipe for recovering a SQL Server database.

The recipe executor is responsible for processing the application recovery recipes. In an embodiment, the recipe executor parses the instructions stored in a recipe to automatically (e.g., without user intervention) recover an application from a snapshot backup of the application, initiate and validate the application for consistency, run application-specific procedures to safeguard against logical errors, data corruptions, or both, shut the application down, and backup the application.

The metrics monitor is responsible for monitoring the execution of a recipe and collecting performance metrics or indicators. A metric may include, for example, a time required to recover an application. The time may be compared to service level objectives (SLOs) in order to measure or assess recovery performance.

Figure 6:
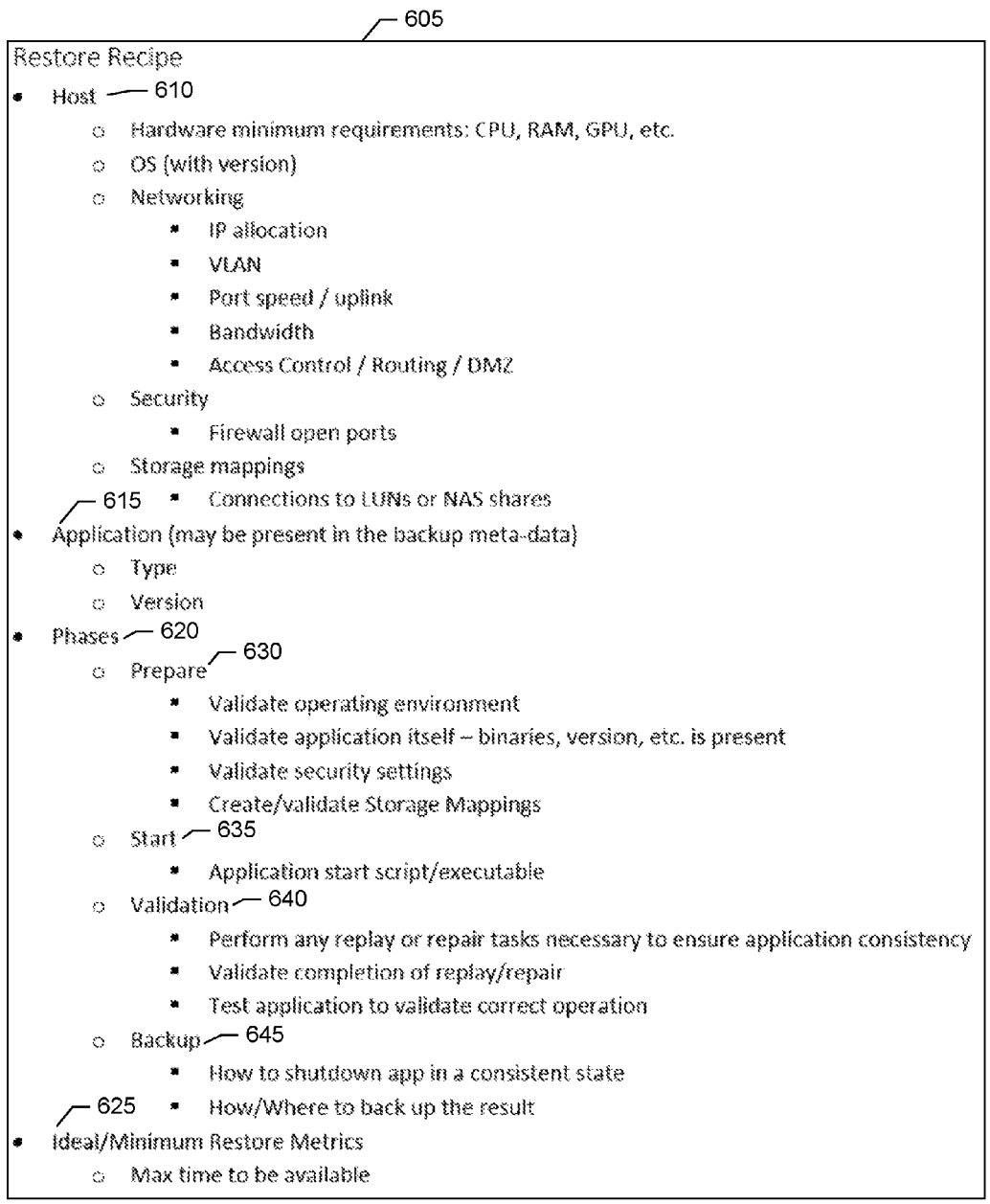
FIG. 6 shows an example of a data structure for an application restore recipe according to an embodiment.

The recovery recipe repository stores any number of application-specific recipes for recovering an application. As discussed, a recipe defines and specifies the parameters, actions, and sequence or ordering of actions for recovering a particular application. FIG. 6 shows an example of a data structure for a recipe 605. The data structure aids in the validation of application recovery and identification of any bottlenecks for the production environment. The restore recipe represents a set of parameters and a sequence of actions that have been defined for application restore. The restore metrics allow for keeping records and measurements of various actions associated with a recovery or restore.

In the example shown in FIG. 6, the recipe is divided into a set of sections including a host section 610, application section 615, phases section 620, and metrics section 625. The recipe may be stored as an Extensible Markup Language (XML) formatted file, a JavaScript Object Notation (JSON) formatted file, or in any other file format as desired.

The host section specifies the configuration parameters for the host (e.g., host 460—FIG. 4) at which the application is to be recovered. The requirements may be specified as minimum requirements. As shown in the example of FIG. 4, the host configuration parameters may specify requirements for the host central processing unit (CPU), random access memory (RAM), graphics processing unit (GPU), operating system (OS), OS version, networking configurations, security configurations (e.g., firewall ports to be opened), storage mappings (e.g., connections to LUNs or NAS shares), or combinations of these. The host section defines the configuration and setup of the recovery system, e.g., how much CPU, memory, disk, networking, security, and so forth.

For example, the recipe may specify that the host include a particular number of CPUs, a particular amount of memory, and so forth. Networking configurations may include configuring a software-defined network (SDN), Internet Protocol (IP) address allocations, virtual local area network (VLAN) configurations, port speed/uplink requirements, bandwidth requirements, access control configurations, routing configurations, demilitarized zone (DMZ) configurations, and so forth. A DMZ is a physical or logical sub-network that separates an internal local area network (LAN) from other untrusted networks. A VLAN is an abstraction of a local area network. A VLAN may include a subset of the ports on a single switch or subsets of ports on multiple switches. Systems on one VLAN may not have access to the traffic associated with systems on other VLANs on the same network. VLANs allow network administrators to partition their networks to match the functional and security requirements of their systems without having to run new cables or make major changes in the current network. The networking configurations allow different components of an application that may reside on a network to communicate. The configuring may include configuring a virtual machine or container in which the application will be recovered.

In an embodiment, the host section specifies the requirements for the recovery system environment so that the recovery system environment will be a replica of the production system environment. As discussed, such requirements may include network requirements, CPU requirements, security requirements, disk space requirements, and so forth. The recovery coordinator can parse the recipe and automatically configure the host environment so that it is a replica of the production system environment.

The recipe, however, provides a very flexible structure through which the administrator can specify the configuration requirements for the recovery host. This flexible structure allows for a judicious use of computing resources. In some cases, the configuration of the recovery host will be different from the configuration of the production host. For example, the recovery host may include less memory, fewer CPUs, less disk space, and so forth as compared to the production host because customers are not accessing the recovery system. Indeed, it can be very expensive to maintain a recovery system having computing resources identical to the production system.

Alternatively, an administrator may use the recipe to configure the recovery host with more computing resources or a different set of resources than the production host. For example, the workload for the recovery host may be different or of a different type from the workload in the production host. The workload for the recovery host may include processing a greater amount of data as compared to the workload for the production host which, at any given time, may be processing just a subset of the data. In other words, the goals or objectives of the production and recovery environments may differ. The goal of the production environment may be to serve the client or customer (e.g., provide quick responses to various requests). The goal of the recovery environment may be to bring the application into a consistent state as quickly as possible.

As a result, the recovery host may be provisioned with or include, for example, a larger cache, more memory, or more CPU as compared to the production host. As another example, the recovery environment may be provisioned with an SSD (solid-state drive) and the production environment may have instead a non-SSD drive (e.g., a spindled hard drive (HDD)) because the performance of the SSD drive is not required for the production environment. Alternatively, the recovery environment may be provisioned with the HDD drive whereas the production environment includes the SSD drive.

The structure of the recipe allows for very fine granularity in specifying the various host computing resource requirements including, for example, the type of resource and amount of resource. Because of the differences in workload or workload types that are processed by the recovery and production environments, a particular resource may contribute more or less to overall performance. For example, a high performance drive (e.g., SSD) may have a greater impact in the recovery environment than CPU. Conversely, CPU may have a greater impact in the production environment than a high performance drive. Thus, the administrator may specify, through the recipe, that the recovery host include an SSD drive and a specified number of processors whereas the production environment includes a lower performance drive (e.g., HDD), but a higher number of processors as compared to the specified number of processors for the recovery environment.

In an embodiment, the recovery coordinator includes a search engine that searches for pre-configured host computers that might be suitable as a recovery host. In this specific embodiment, the search engine can compare the recovery host requirements as specified in the recipe with the capabilities of various candidate hosts, and select or choose a candidate host whose capabilities best match the recovery host requirements as specified in the recipe. In this specific embodiment, the recipe can define the minimum hardware required for the recovery host to ensure that the selected candidate host has at least the minimum hardware as specified in the recipe. In some cases, a candidate host having much more than the minimum requirements as specified in the recipe will be passed over by the recovery coordinator in favor of another candidate host having less capabilities. This allows the former candidate host to remain available as a recovery host for other applications that may require a greater number, amount, or level of resources.

The recovery coordinator may instead or additionally include a configuration module that automatically configures on-demand a recovery host. For example, the configuration module may interface through an API with a virtual machine manager to automatically configure a virtual machine having the configuration (e.g., memory, CPU, disk space, and so forth) as specified in the recipe.

The application section may specify a name of the application, type of application, application version, or combinations of these.

In an embodiment, the phases section includes a preparation phase 630, start phase 635, validation phase 640, and backup phase 645. The phases specify parameters, actions, and a sequence or ordering of actions for preparing, starting, validating, and backing up an application. Recovering an application may require not only that certain steps are performed, but that the steps are performed in a specific order. These tasks or steps and their specific order may be defined within the recipe. The tasks, ordering of the tasks, or both may vary depending upon the specific application.

For example, a recipe for a particular application may specify the actions including (1) starting the application, (2) playing back logs against the application, (3) running one or more checks or repairs on the application, and (4) running application-specific procedures to check functional correctness of the application. Another recipe for a different application may specify the same set of tasks, but in a different order. Another recipe for a different application may specify a different set of tasks. For example, if the application is not a database application, the step of playing back logs against the application may be omitted as playing back logs generally applies to database applications. As another example, the application may be a video hosting application and a validation procedure may include checking various frames of a video to ensure the video is playing correctly.

The preparation phase may include, for example, validating the host operating environment, validating the application to be recovered, validating security settings, creating and validating storage mappings, and so forth. Validating the application may include validating that the application binaries are present (e.g., present on the recovery host), validating the application version (e.g., confirming that the application version on the recovery host matches the application version as specified in the corresponding recovery recipe), or both.

Creating and validating storage mappings may include mounting a LUN on the host, mounting a virtual hard disk file having the recovered database, mounting a virtual hard disk file having the uncommitted log files, identifying and configuring the host OS to ensure that the partitions and file systems necessary to store the data for the application are present, configuring folder paths for the recovered application, and the like. Configuring the folder paths helps to point the recovered application to the data stored on the recovery primary storage that the recovery coordinator copied over from the backup storage. The configuration helps to ensure that the folder locations on the primary recovery storage are the same as the folder locations on the backup storage.

The start phase specifies the application start script, executable, or command for starting the recovered application. The validation phase specifies the validation processes to apply to the recovered application. Validating may include performing any replay or repair tasks necessary to ensure application consistency, playing back logs, replaying uncommitted log files against the recovered database, validating the completion of a replay, validating the completion of a repair, testing the application to validate correct operation, checking data files for corruption (e.g., physical corruption or logical corruption), verifying that a data file is in the correct directory, running consistency checks, attaching the recovered database to the application, connecting to the recovered database, verifying that a particular table is present and accessible, repairing corruptions, running checks, verifying that a particular process has started, verifying that a particular file is present, or combinations of these. There can be application-specific procedures to check the functional correctness of the application to guard against logical errors, data corruption, or both.

The validation phase can be optional and may not be included in some embodiments of a recipe. For example, a particular application may not provide an API through which the recovery coordinator can use to perform a validation. Instead or additionally, an administrator may decide to skip the validation phase or skip certain steps of the validation phase.

As one of skill in the art would recognize, the specific validation steps can vary greatly depending upon the specific application. For example, replaying or playing back logs generally applies to database applications and other applications may not provide for such logs. As discussed, the structure of the recipe can accommodate other applications which may not include logs, but which may include other validation procedures.

The backup phase specifies the procedures or commands for shutting down an application so that it is in a consistent state, backing up the shutdown application, and a location, target, or destination of the backup. The metrics section specifies a set of metrics that may be associated with each phase. The metrics specify the performance parameters that should be measured for each of the phases. The system is flexible and allows the administrator to identify the number of variables for each phase that the administrator wishes to measure.

In an embodiment, recipes can be nested. A recipe may include a function or procedure that calls or references another recipe. For example, certain procedures may be common across two or more different applications (e.g., creating a VM within which an application may be restored). Common procedures may be stored as recipes such as in a library. When developing a recipe for a specific application, a function call may be inserted into the recipe that calls another pre-defined recipe of common procedures. The ability to nest recipes helps to speed the recipe development process because an administrator will not have to explicitly specify the same set of steps across different recipes for different applications. As another example, there can be different databases. Each database, however, may provide for the same steps in performing a backup and starting up the database, but different steps for validation. In this case, there can be a template recipe stored in a library of the system that specifies backup and startup steps for a database. There can be a specific recipe that includes explicit validation steps for a particular database (e.g., Oracle database) and a function call to the template recipe, stored in the library, specifying steps for backing up and starting a database.

Figure 7:
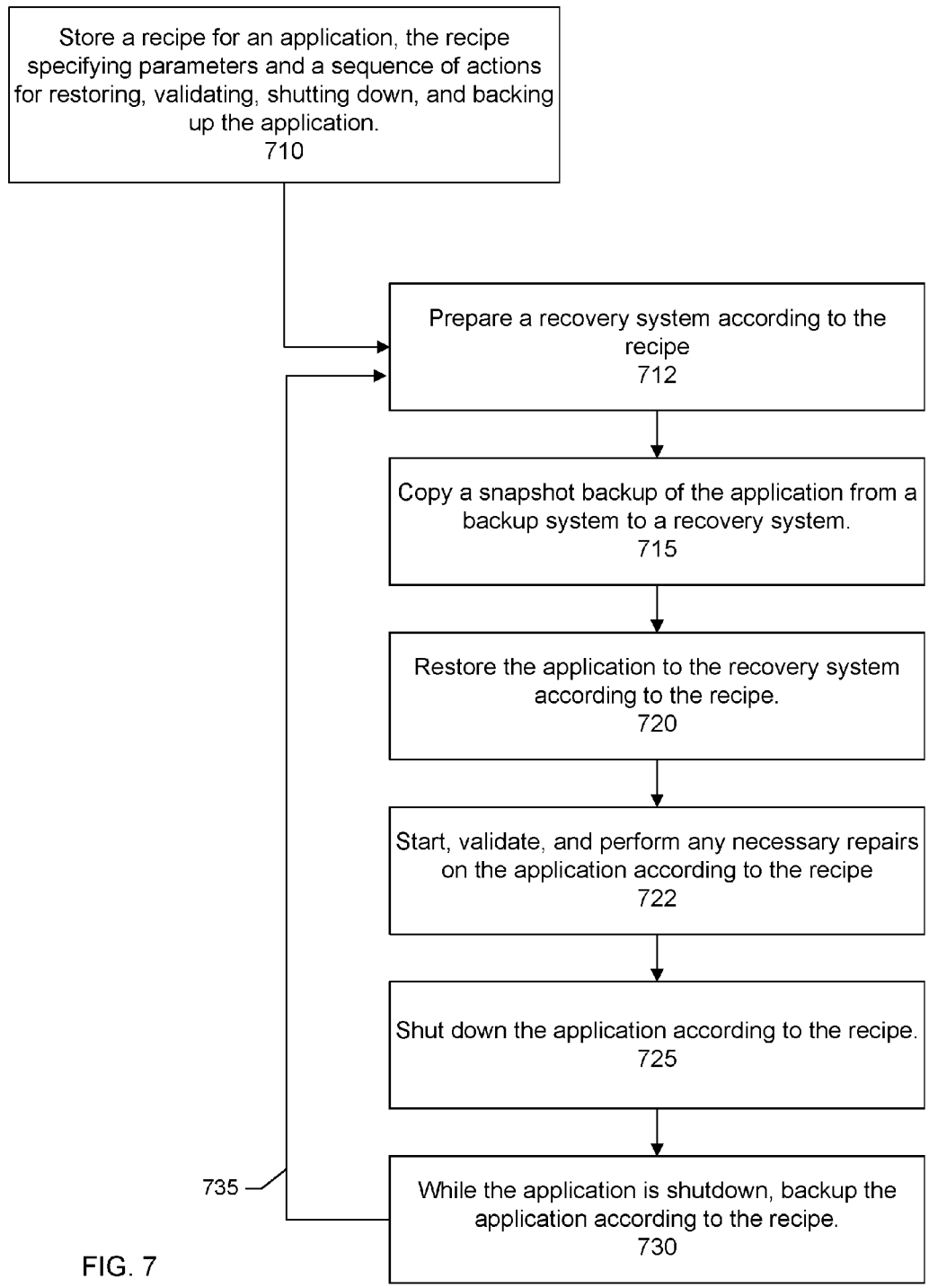
FIG. 7 shows a flow for processing a recipe according to an embodiment.

FIG. 7 shows an overall flow of a process for primed application recovery. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 710, a recipe is stored for an application. The recipe specifies parameters and a sequence of actions for restoring the application, bringing the application into a consistent state, safely terminating the application, and backing up a validated consistent version of the application.

In a step 712, a recovery system is prepared according to the recipe. As discussed, the recipe provides information about the environment the application is being restored within. The recovery coordinator consults the recipe for selecting an appropriate datacenter, hardware, virtual machine, validating against specific requirements, and configuring the environment to properly host the application.

In a step 715, after the recovery system is prepared, a snapshot backup of the application is copied from a backup system to the recovery system. In an embodiment, the application includes a database application and the copying includes copying uncommitted log files of the snapshot backup of the database to the recovery system.

Figure 8:
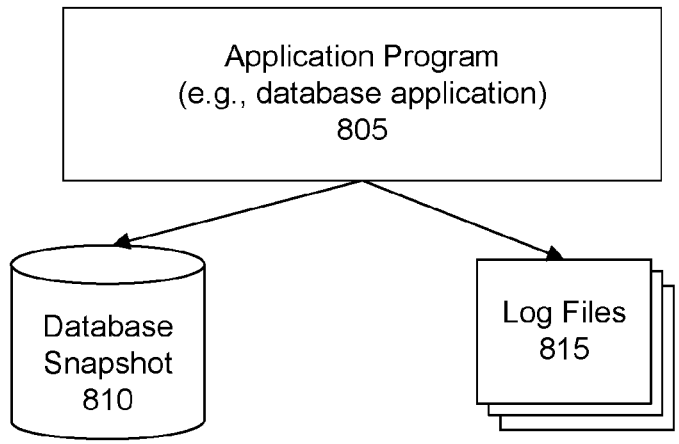
FIG. 8 shows a block diagram of a database application.

FIG. 8 shows a block diagram of data that may be copied from backup storage to primary recovery storage. In the example shown in FIG. 8, a backup of an application 805 such as a database or other application may include a snapshot backup 810 of a database and one or more log files 815. For some applications, data is first written from memory to a log file. The application can pre-allocate or pre-determine a size for the log file (e.g., 1 megabyte (MB)). When a size of a current log file reaches the pre-determined size, the application creates a new log file. At some point, the log files are committed to the database. That is, the transactions or data stored in the log files are written to or incorporated into the database. The writing of transactions and other data in a log file to the database may occur during idle machine cycle such as during off-peak times so that computing resources can be devoted to other tasks during peak times.

Referring back now to FIG. 7, in a step 720, the application is restored to the recovery system according to the recipe. In a step 722, after the application is restored, the application is started, validated, and repaired as necessary on the recovery system according to the recipe. In an embodiment, the validation includes the replaying of log files. During the replay, transactions or other data recorded in the log files are committed to the database. As a result, the database may be updated. That is, the database as recovered on the recovery system may be different from the snapshot backup of the database on the backup system as the recovered database may be updated to include transactions from the log files and the snapshot backup may not include the transactions from the log files. The restoration may include running validation scripts specified in the restore recipe corresponding to the application.

In a step 725, after the application has been recovered to the recovery system, started, repaired, and validated, the application is shutdown according to the shutdown procedures specified in the recipe. For example, the recipe may specify a shutdown command or script specific to the application and that allows the application to close its various files, complete transactions, process uncommitted log or other files, transition into a quiesced state, and so forth. Since the recovered application is in the recovery environment—and not the production environment—the time the application requires to properly shutdown will not affect the organization's other users and customers. Indeed, depending upon factors such as the type of application, state of the application backup, amount of backed data, and other factors, it may take very long time (e.g., many hours) to bring the application into a ready state. For example, replaying a transaction log for a database may take 1, 2, 3, 4, 5, or more than 5 hours.

In an embodiment, no changes to the application (e.g., writes to the database) are permitted to occur between the completion of validation and the shutdown of the application since the application is on the recovery system. In a step 730, after or while the application is shutdown, the recovery coordinator backups the application according to the recipe. Since the application has been given time to properly and safely shutdown and be brought to a consistent state, the backup of the application will be an application-consistent backup. An application-consistent backup provides a higher level of protection and consistency as compared to a snap-or crash-consistent backup. An application-consistent backup of a database can capture pending transactions that may be stored in log files, cache, memory, and so forth.

In FIG. 7, step 710 (storing the recipe) is shown offset from the other steps to indicate that storing the recipe can be a one-time action. As shown by loop 735, steps 712-730 can be performed any number of times using the same recipe. In an embodiment, there can be a primed application recovery schedule. The primed application recovery schedule may be separate from or independent of the production backup schedule. The primed application recovery schedule specifies the time and frequency at which a primed application is generated. For example, the primed application recovery schedule may specify that a primed application (e.g., an application-consistent backup) is to be generated daily, weekly, or at any other frequency as desired. At the scheduled time, the recovery coordinator can obtain a snap- or crash-consistent backup of the application and create an application-consistent backup of the application according to steps 712-730. Steps 712-730 may be part of normal or day-to-day operations.

Figure 9:
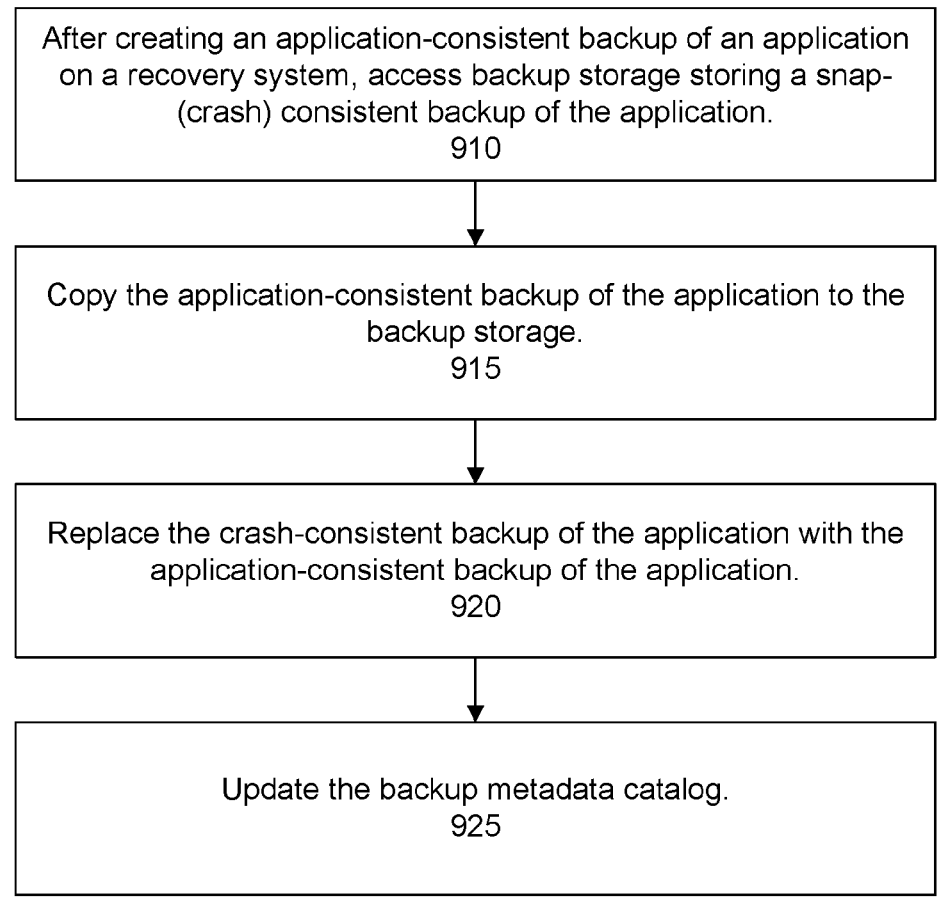
FIG. 9 shows a flow for updating the backup storage with an application-consistent backup according to an embodiment.

FIG. 9 shows a flow of a process for updating backup storage according to an embodiment. In a step 910, after the recovery coordinator creates an application-consistent backup of an application, the recovery coordinator accesses backup storage storing a snap- or crash-consistent backup of the application. In a step 915, the application-consistent backup of the application is copied from the recovery system to backup storage. Once the application-consistent backup of the application has been copied from the recovery system to backup storage, the application-consistent backup of the application may be deleted or removed from the recovery system. The deletion helps to free up space on the recovery system. Alternatively, the application-consistent backup of the application may be maintained on the recovery system. For example, it can be desirable to keep the application ready on demand for failover.

In a step 920, the snap- or crash-consistent backup of the application on backup storage is replaced with the application-consistent backup of the application. The replacement may include deleting or removing from backup storage the snapshot backup of the application and corresponding log files. The deletion helps to increase the storage space available on backup storage. In some cases, both the crash-consistent backup and the application-consistent backup may be maintained on backup storage.

In a step 925, the backup metadata catalog may be updated to indicate that backup storage now includes an application-consistent backup of the application. In an embodiment, a backup time and date of the corresponding snap- or crash-consistent backup may be associated with the application-consistent backup of the application—even though the application-consistent backup of the application may have occurred much later in real-time as the application-consistent backup was performed on the recovery system. The association allows, however, maintaining a consistent and chronological ordering of backups. For example, table A below shows an example of metadata that may be stored in the backup metadata catalog.

TABLE A

| Backup | Backup Time and Date |
|---|---|
| Backup A | 1:30:02 PM, Oct. 9, 2016 |
| Backup B | 2:30:07 PM, Oct. 10, 2016 |
| Backup C | 2:15:09 PM, Oct. 11, 2016 |

The data in table A shows that backup A was generated at 1:30:02 PM, Oct. 9, 2016; backup B was generated 2:30:07 PM, Oct. 10, 2016; and backup C was generated 2:15:09 PM, Oct. 11, 2016. Consider, as an example, that backups A-C are crash-consistent backups.

Table B below shows an example of the metadata catalog after one of the backups on the backup system (e.g., backup A) has been replaced with an application-consistent backup.

TABLE B

| Backup | Backup Time and Date |
|---|---|
| Backup A' | 1:30:02 PM, Oct. 9, 2016 |
| Backup B | 2:30:07 PM, Oct. 10, 2016 |
| Backup C | 2:15:09 PM, Oct. 11, 2016 |

In table B, "Backup A'" represents the application-consistent backup of corresponding crash-consistent backup "Backup A" shown in table A. The backup time and date of "Backup A'," however, is shown as "1:30:02 PM, Oct. 9, 2016"—the time and date of crash-consistent Backup A—even though application-consistent backup "Backup A'" may have occurred after "1:30:02 PM, Oct. 9, 2016." Replacing a crash-consistent backup on a backup storage system with an application-consistent backup, but maintaining the time and date of the crash-consistent backup with the application-consistent backup helps to properly reflect a backup of production with respect to a particular point in time. In an embodiment, a method may include replacing, on a backup storage system, a crash-consistent backup of an application with an application-consistent backup of the application, and associating a time and date of the crash-consistent backup with the application-consistent backup, where an actual time and date of the application-consistent backup is after the time and date of the crash-consistent backup.

Figure 10:
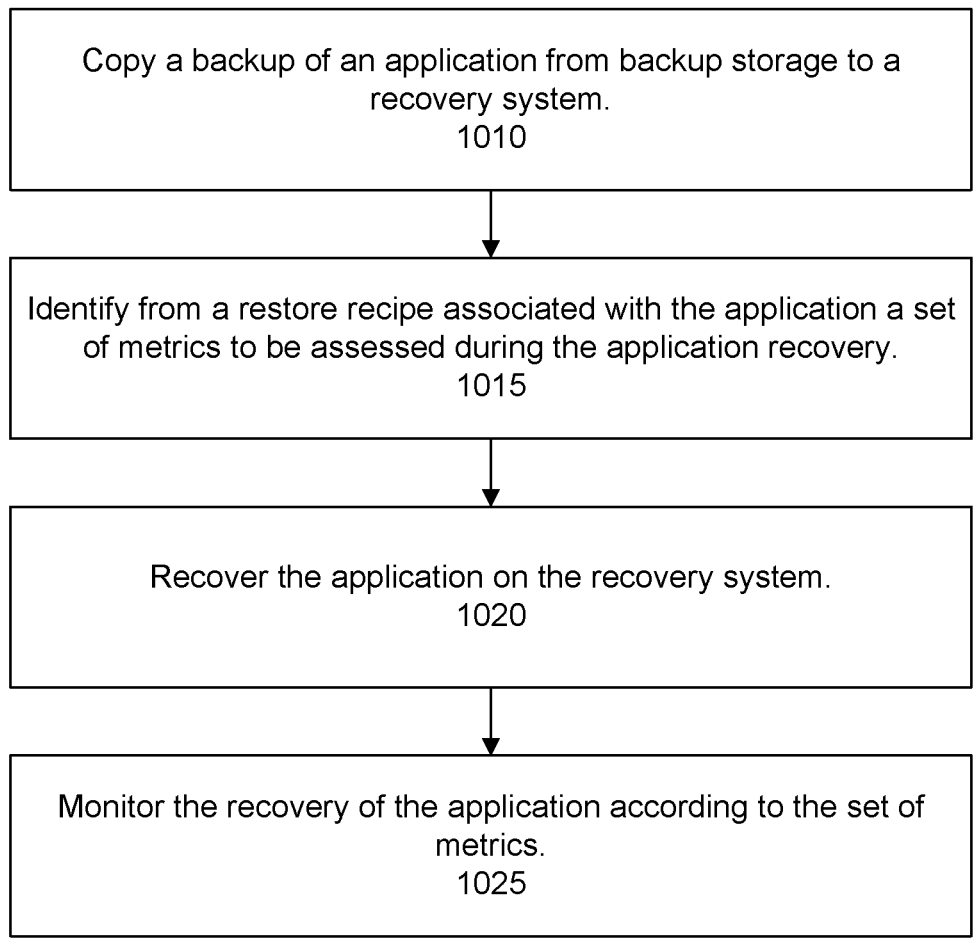
FIG. 10 shows a flow for monitoring the progress of an application recovery according to an embodiment.

FIG. 10 shows a flow of a process for capturing metrics associated with the recovery of the application. In a step 1010, the recovery coordinator copies a backup of an application from backup storage to the recovery system. In a step 1015, the recovery coordinator identifies from the restore recipe associated with the application a set of metrics to be assessed during the application recovery. In a step 1020, the application is recovered on the recovery system.

In a step 1025, the recovery coordinator monitors the progress of the recovery of the application according to the set of metrics. In a specific embodiment, each phase of the restore recipe is associated with a particular set of metrics. The metrics may be stored as key-value pairs where the key includes the data label and the value includes the data value (e.g., date, time, speed, and so forth).

For example, a first set of metrics associated with the preparation phase may be associated with tracking the amount of time required to prepare the recovery host. A second set of metrics associated with the start phase may be associated with tracking the amount of time required to start the application on the recovery host. A third set of metrics associated with the validation phase may be associated with tracking the amount of time required to validate the application on the recovery host. A fourth set of metrics associated with the backup phase may be associated with tracking the amount of time required to backup the application on the recovery host.

The metrics can capture, for example, how long it took bring up the environment, how long it took to transfer data, how long it took to shut the application down, how long it took to shut the virtual machine down, and the like. The recovery coordinator can monitor the progress of activity on the recovery host, activity between the recovery host and recovery primary storage, activity between the backup storage and recovery primary storage, and other activities. The key value structure allows the administrator to define their own units. For example, time (e.g., number of milliseconds) is an example of a metric or unit that may be defined. Speed or transfer speed (e.g., megabits per second) is another example of a unit that may be defined.

In a specific embodiment, a recipe may include a phase specifying the recovery of an application-consistent backup of an application and a set of metrics associated with the phase. For example, in an embodiment, after the recovery coordinator has created the application-consistent backup of the application, the recovery coordinator may, according to the recipe, recover the application-consistent backup of the application to the recovery system. The recovery coordinator may monitor the recovery and record metrics associated with the recovery. These metrics can be used to assess whether or not the recovery meets service level objectives, to identify bottlenecks in the recovery procedure, and so forth.

For example, an SLO may specify that an application must be able to be recovered within a particular period of time. The collection of metrics by the recovery coordinator allows for testing or determining whether or not that SLO may be satisfied. In an embodiment, the recovery coordinator compares the collected metrics against metrics specified in an SLO. If there is a deviation, an alert for the administrator is generated. The administrator can then review the resources available to handle a recover and make changes as needed. Such changes may include adding additional resources to meet the SLO, scaling back the SLO, or both.

Alternatively, an application-consistent backup of the application may already exist on backup storage. It can be desirable, however, to recover the application to the recovery system as a verification and guarantee that the application can indeed be properly recovered should the need arise. The recovery coordinator helps to provide the administrator with peace-of-mind over the integrity of a backup. The recovery recipe provides a set of defined, tested, automated, and repeatable steps for recovering an application.

Phases such as the recovery, startup, validation, and shutdown of the application-consistent backup may similarly be monitored and statistics or metrics collected. In other words, the same or similar process can be used to test a disaster recovery process with the help of the statistics or metrics. For example, a customer might have an SLA of 2 hours for their production database. This process can be used to verify that SLA requirement of 2 hours. If the time recorded by the recovery coordinator exceeds the SLA requirement, the statistics would then help the customer to figure out or determine where the time is being spent for each part of the recipe in order to reach that SLA.

Below are some benefits of the recovery and service level objective validation procedures:

1) Ensure that when a disaster occurs, the applications can be available using a proven method, within a tested time period.

2) Capture metrics of the restore procedure to validate against expectations (SLO) and compare to previous restores.

3) Identify specific bottlenecks referenced to the recipe phases. The capturing of statistical data for each process within a recipe allows users or customers to identify what phase requires the most time to complete. The identified phase can then be examined in detail so that improvements in efficiency can be made.

In an embodiment, a method may include providing a recovery recipe having a set of metrics, copying an application-consistent backup of an application on a backup system to a recovery system, recovering the application-consistent backup on the recovery system, and during the recovery, measuring the metrics specified in the recovery recipe.

In some cases, after an application-consistent backup of an application is generated from a snap-consistent or crash-consistent backup of the application, the application-consistent backup of the application may be recovered to the recovery system. Metrics, as specified in the corresponding recipe, may be measured during the recovery of the application-consistent backup. A recipe may specify two different sets of host configuration parameters. A first set of host configuration parameters may be used when the recovery host is used to create a primed application (e.g., convert a snap-consistent backup to an application-consistent backup). A second set of host configuration parameters may be used when the recovery host is used to test the recovery of the application-consistent backup. The first and second set of host configuration parameters may be different from each other. The second set of host configuration parameters may be used to replicate the configuration of the production environment. This helps to provide an accurate assessment of how long it would likely take to recover the application to the production environment if required.

In an embodiment, a method may include comparing the metrics captured during a restore of an application against expected metrics or metrics captured from previous restores. Comparing against expected metrics can be used to determine whether or not recovery objectives are being met. Comparing against metrics captured from previous restores can be used for analyzing trends. An analysis of trends can be helpful in predicting the outcome of future recoveries.

There can be two types of recipes for a particular application. A first type of recipe may be used when the backup of the application is a snap- or crash-consistent backup. A second type of recipe may be used when the backup of the application is an application-consistent backup. Each recipe may have a different set of tasks, ordering of the tasks, host configuration parameters, metrics, or combinations of these. Alternatively, there can be a single recipe having multiple sections. A first section of the recipe may be applied when the backup of an application is a snap- or crash-consistent backup. A second section of the recipe may be applied when the backup of the application is an application-consistent backup. In an embodiment, the recovery coordinator includes logic to distinguish or detect whether a backup of an application is a snap- or crash-consistent backup versus an application-consistent backup.

In a specific embodiment, systems and techniques are provided for a primed restore of an application such as an Oracle application. Restore metrics are captured to measure against SLO. In this specific embodiment, primed restore steps are taken to ensure the restored application is in a consistent state and has been validated functional, then a new backup is taken to preserve the validated application copy that is ready to run. In addition, the recovery/SLO validation procedures and key metrics are captured to measure recovery performance against business level SLO, so a realistic recovery time window can be determined, and to also uncover critical bottlenecks that would impact the SLO.

Table C below shows a flow for primed restore steps of an Oracle application according to a specific embodiment. In this example, the backup of the Oracle application is provided by a backup product referred to as Avamar from EMC Corporation.

TABLE C

| Step | Description |
|------|-------------|
| 1 | Avamar Oracle plugin back-up Oracle app |
| 2 | Find an appropriate host and storage location to restore to and start the application |
| 3 | Restore from backup to the storage and host |
| 4 | Configure host OS with appropriate storage mappings |
| 5 | Start Oracle on the Host |
| 6 | Wait for repair/replay completion |
| 7 | Perform validations |
| 8 | Clean shutdown application |
| 9 | Backup primed environment with Avamar Oracle plugin |

Figure 11:
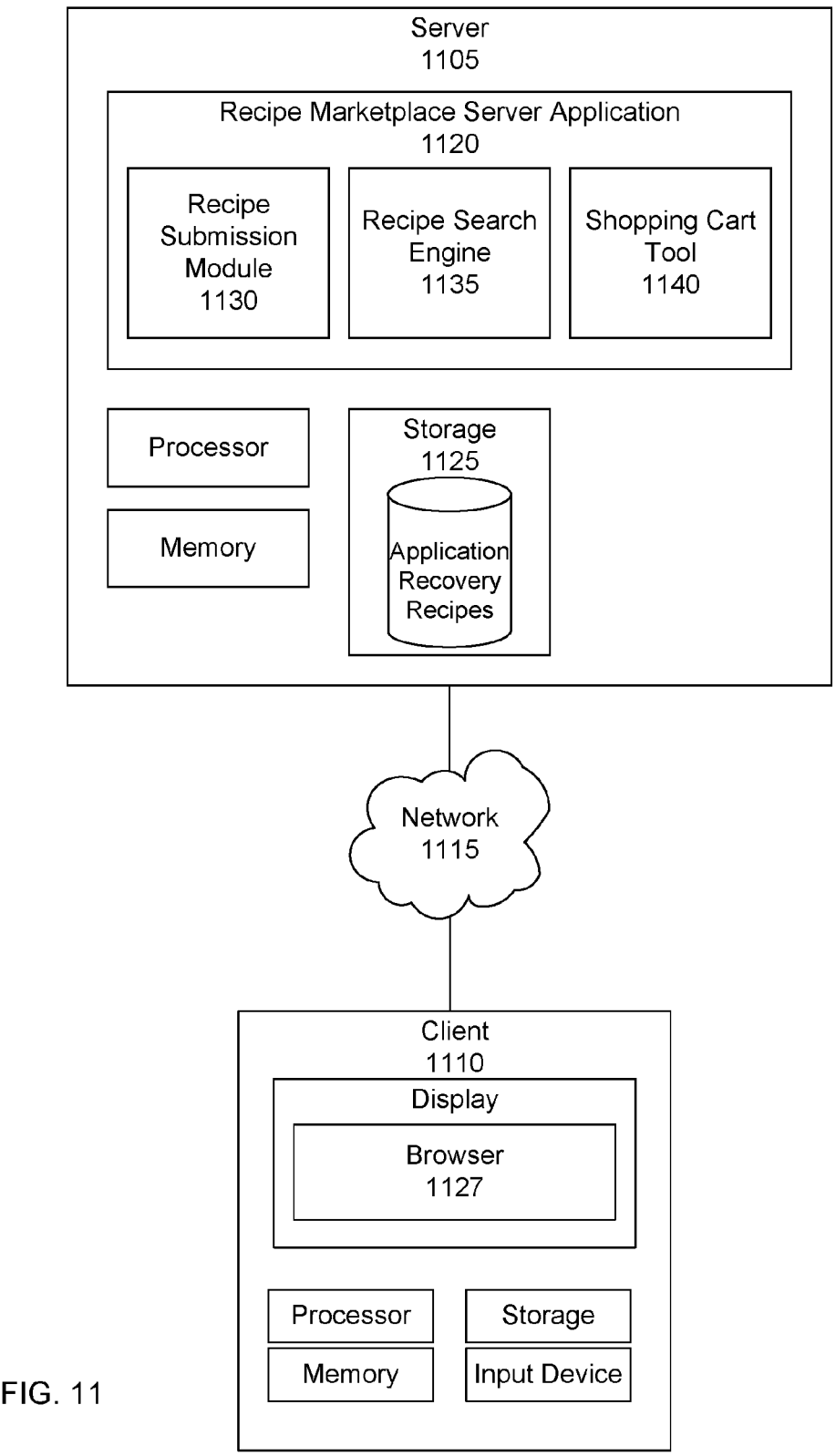
FIG. 11 shows a block diagram of a restore recipe marketplace according to an embodiment.

FIG. 11 shows a block diagram of recipe marketplace according to another specific embodiment. In this specific embodiment, recipes may be shared (or bought and sold) among different members and organizations participating in the marketplace. In the example shown in FIG. 11, there is a server 1105, a client 1110, and a network 1115 connecting the client and server. The server includes a marketplace server application 1120 and storage 1125 that stores a library of application recovery recipes for any number of various applications. In an embodiment, users at clients 1110 can access the marketplace using, for example, a browser program 1127 (e.g., Google Chrome or Windows Edge). With the browser program, users can submit recipes, search recipes, and download recipes.

The marketplace server includes a recipe submission module 1130, a recipe search engine 1135, and a shopping cart tool 1140. The recipe submission module is responsible for receiving recipe submissions from users. In an embodiment, the system provides a recipe definition that specifies the structure and format for a recipe. Individual administrative users, vendors of specific application programs, or both can access the recipe template to create an application recovery recipe as described. The recipe can then be transmitted to the marketplace via the recipe submission module. The submission module may include logic to review and validate that a submitted recipe is correctly formatted.

The recipe search engine receives a query from the user and searches the stored application recovery recipes. The query may include, for example, the name of an application that the user would like to be able to prime for recovery.

The shopping cart tool provides an electronic shopping cart that the user can use to select recipes to be downloaded. In an embodiment, the shopping cart tool includes a checkout procedure. The user can add to the electronic shopping cart recipes that the user would like to purchase. Once finalized, the user can checkout and purchase the recipes added to the shopping cart. Purchased recipes may then be downloaded or transmitted to the user's client computer.

The marketplace server provides tools for maintaining an online collection of recovery recipes for any number of different applications. In an embodiment, the applications themselves, however, may or may not be available on the recipe marketplace. The recipes may be provided by any number of third parties including application developers, vendors, administrators, and others. The marketplace provides an online store where administrators and organizations can discover and purchase recovery recipes.

In an embodiment, the recipes provided on the marketplace are available in source-code format. This allows users of the marketplace to modify a recipe to suit their particular needs. The recipes may be provided as templates having a set of basic actions and tasks that are common to many applications. A user can modify a recipe template as needed based on their particular computing system and application. For example, a user may wish to insert their own configuration parameters for the host recovery system, develop their own set of metrics, include specific validation scripts, and so forth.

In a specific embodiment, a method includes storing a recipe for an application, the recipe specifying parameters and actions for restoring the application, bringing the application into a consistent state, safely terminating the application, and backing up a validated consistent version of the application; copying a snapshot backup of the application from a backup system to a recovery system, wherein the snapshot backup of the application on the backup system is a crash-consistent backup of the application; restoring the application to the recovery system according to the recipe; after the restoring the application, shutting down the application according to the recipe; and while the application is shutdown on the recovery system, backing up the application according to the recipe to create an application-consistent backup of the application.

The method may include replacing the snapshot backup of the application on the backup system with the application-consistent backup of the application. The method may include after the replacing, deleting the application-consistent backup of the application on the recovery system. The method may include before the shutting down the application, initiating and validating consistency of the restored application according to the recipe, the initiating and validating consistency comprising: starting the application; running one or more of checks or repairs on the application; and running application-specific procedures to check functional correctness of the application to safeguard against logical errors or data corruption. The method may include before the shutting down the application, playing back logs against the application.

In an embodiment, the recipe is a first recipe and the method includes storing a second recipe, different from the first recipe, for a second application, the second recipe specifying parameters and actions for restoring, shutting down, and backing up the second application; copying a snapshot backup of the second application from the backup system to the recovery system, wherein the snapshot backup of the second application on the backup system is a crash-consistent backup of the second application; restoring the second application to the recovery system according to the second recipe; after the restoring the second application, shutting down the second application according to the second recipe; and while the second application is shutdown on the recovery system, backing up the second application according to the second recipe to generate an application-consistent backup of the second application.

In an embodiment, the snapshot backup of the application comprises a backup of the application created while the application is running, and the application-consistent backup comprises a backup of the application created while the application is shutdown. The recipe may specify a configuration of the recovery system, the configuration specifying network requirements, CPU requirements, memory requirements, security requirements, and disk space requirements, and the method may include configuring the recovery system according to the recipe.

In an embodiment, the recipe specifies a set of metrics to be measured during a recovery of the application and the method includes: obtaining the application-consistent backup of the application; recovering the application-consistent backup of the application to the recovery system; and measuring the recovery according to the set of metrics. In another embodiment, the method includes maintaining an online marketplace comprising a plurality of recipes for a plurality of applications.

In a specific embodiment, there is a system for priming an application for recovery, the system including: a processor-based system executed on a computer system and configured to: store a recipe for the application, the recipe specifying parameters and actions for restoring, shutting down, and backing up the application; copy a snapshot backup of the application from a backup system to a recovery system, wherein the snapshot backup of the application on the backup system is a crash-consistent backup of the application; restore the application to the recovery system according to the recipe; after the restore of the application, shut down the application according to the recipe; and while the application is shutdown on the recovery system, backup the application according to the recipe to create an application-consistent backup of the application.

In another specific embodiment, there is a computer program product, comprising a non-transitory computer-readable medium having a computer-readable program code embodied therein, the computer-readable program code adapted to be executed by one or more processors to implement a method including: storing a recipe for an application, the recipe specifying parameters and actions for restoring, shutting down, and backing up the application; copying a snapshot backup of the application from a backup system to a recovery system, wherein the snapshot backup of the application on the backup system is a crash-consistent backup of the application; restoring the application to the recovery system according to the recipe; after the restoring the application, shutting down the application according to the recipe; and while the application is shutdown on the recovery system, backing up the application according to the recipe to create an application-consistent backup of the application.

In another specific embodiment, a method includes storing a recipe for an application, the recipe specifying parameters and actions for restoring the application, bringing the application into a consistent state, safely terminating the application, and backing up a validated consistent version of the application; copying a snapshot backup of the application from a backup system to a recovery system, wherein the snapshot backup of the application on the backup system is a crash-consistent backup of the application; restoring the application to the recovery system according to the recipe; after the restoring the application, shutting down the application according to the recipe; and while the application is shutdown on the recovery system, backing up the application according to the recipe to create an application-consistent backup of the application. The method may include replacing the snapshot backup of the application on the backup system with the application-consistent backup of the application.

In an embodiment, the method includes before the shutting down the application, initiating and validating consistency of the restored application according to the recipe, the initiating and validating consistency including: starting the application; playing back logs against the application; running one or more of checks or repairs on the application; and running application-specific procedures to check functional correctness of the application to safeguard against logical errors or data corruption.

In an embodiment, the recipe is a first recipe and the method includes: storing a second recipe, different from the first recipe, for a second application, the second recipe specifying parameters and actions for restoring the second application, bringing the second application into a consistent state, safely terminating the second application, and backing up a validated consistent version of the second application; copying a snapshot backup of the second application from the backup system to the recovery system, wherein the snapshot backup of the second application on the backup system is a crash-consistent backup of the second application; restoring the second application to the recovery system according to the second recipe; after the restoring the second application, shutting down the second application according to the second recipe; and while the second application is shutdown on the recovery system, backing up the second application according to the second recipe to generate an application-consistent backup of the second application.

The method may include replicating an environment of a production system having the application to the recovery system, wherein the replicating comprises replicating network requirements, CPU requirements, and disk space requirements.

In another specific embodiment, there is a system for priming an application for recovery, the system including: a processor-based system executed on a computer system and configured to: store a recipe for the application, the recipe specifying parameters and actions for restoring the application, bringing the application into a consistent state, safely terminating the application, and backing up a validated consistent version of the application; copy a snapshot backup of the application from a backup system to a recovery system, wherein the snapshot backup of the application on the backup system is a crash-consistent backup of the application; restore the application to the recovery system according to the recipe; after the restore of the application, shut down the application according to the recipe; and while the application is shutdown on the recovery system, backup the application according to the recipe to create an application-consistent backup of the application.

In another specific embodiment, there is a computer program product, including a non-transitory computer-readable medium having a computer-readable program code embodied therein, the computer-readable program code adapted to be executed by one or more processors to implement a method comprising: storing a recipe for an application, the recipe specifying parameters and actions for restoring the application, bringing the application into a consistent state, safely terminating the application, and backing up a validated consistent version of the application; copying a snapshot backup of the application from a backup system to a recovery system, wherein the snapshot backup of the application on the backup system is a crash-consistent backup of the application; restoring the application to the recovery system according to the recipe; after the restoring the application, shutting down the application according to the recipe; and while the application is shutdown on the recovery system, backing up the application according to the recipe to create an application-consistent backup of the application.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
   storing a recipe for an application, the recipe specifying parameters and actions for restoring the application, bringing the application into a consistent state, safely terminating the application, and backing up a validated consistent version of the application;
   copying a snapshot backup of the application from a backup system to a recovery system, wherein the snapshot backup of the application on the backup system is a crash-consistent backup of the application;
   restoring the application to the recovery system according to the recipe;
   after the restoring the application, shutting down the application according to the recipe; and
   while the application is shutdown on the recovery system, backing up the application according to the recipe to create an application-consistent backup of the application.

2. The method of claim 1 comprising replacing the snapshot backup of the application on the backup system with the application-consistent backup of the application.

3. The method of claim 1 comprising:
   before the shutting down the application, initiating and validating consistency of the restored application according to the recipe, the initiating and validating consistency comprising:
   starting the application;
   running one or more of checks or repairs on the application; and
   running application-specific procedures to check functional correctness of the application to safeguard against logical errors or data corruption.

4. The method of claim 3 comprising before the shutting down the application, playing back logs against the application.

5. The method of claim 1 wherein the recipe is a first recipe and the method comprises:
   storing a second recipe, different from the first recipe, for a second application, the second recipe specifying parameters and actions for restoring the second application, bringing the second application into a consistent state, safely terminating the second application, and backing up a validated consistent version of the second application;
   copying a snapshot backup of the second application from the backup system to the recovery system, wherein the snapshot backup of the second application on the backup system is a crash-consistent backup of the second application;
   restoring the second application to the recovery system according to the second recipe;

after the restoring the second application, shutting down the second application according to the second recipe; and while the second application is shutdown on the recovery system, backing up the second application according to the second recipe to generate an application-consistent backup of the second application.

6. The method of claim 1 wherein the snapshot backup of the application comprises a backup of the application created while the application is running, and the application-consistent backup comprises a backup of the application created while the application is shutdown.

7. The method of claim 1 wherein the recipe specifies a configuration of the recovery system, the configuration specifying network requirements, CPU requirements, memory requirements, security requirements, and disk space requirements, and the method comprises configuring the recovery system according to the recipe.

8. The method of claim 1 wherein the recipe specifies a set of metrics to be measured during a recovery of the application and the method comprises:

obtaining the application-consistent backup of the application;

recovering the application-consistent backup of the application to the recovery system; and measuring the recovery according to the set of metrics.

9. The method of claim 1 comprising:

maintaining an online marketplace comprising a plurality of recipes for a plurality of applications.

10. A system for priming an application for recovery, the system comprising:

a processor-based system executed on a computer system and configured to:

store a recipe for the application, the recipe specifying parameters and actions for restoring the application, bringing the application into a consistent state, safely terminating the application, and backing up a validated consistent version of the application;

copy a snapshot backup of the application from a backup system to a recovery system, wherein the snapshot backup of the application on the backup system is a crash-consistent backup of the application;

restore the application to the recovery system according to the recipe;

after the restore of the application, shut down the application according to the recipe; and while the application is shutdown on the recovery system, backup the application according to the recipe to create an application-consistent backup of the application.

11. The system of claim 10 wherein the processor-based system is configured to:

replace the snapshot backup of the application on the backup system with the application-consistent backup of the application.

12. The system of claim 10 wherein the processor-based system is configured to:

before the shutdown of the application, initiate and validate consistency of the restored application according to the recipe, the initiation and validation of consistency comprising:

starting the application;

running one or more of checks or repairs on the application; and running application-specific procedures to check functional correctness of the application to safeguard against logical errors or data corruption.

13. The system of claim 10 wherein the recipe is a first recipe and the processor-based system is configured to:

store a second recipe, different from the first recipe, for a second application, the second recipe specifying parameters and actions for restoring the second application, bringing the second application into a consistent state, safely terminating the second application, and backing up a validated consistent version of the second application;

copy a snapshot backup of the second application from the backup system to the recovery system, wherein the snapshot backup of the second application on the backup system is a crash-consistent backup of the second application;

restore the second application to the recovery system according to the second recipe;

after the restoration of the second application, shut down the second application according to the second recipe; and while the second application is shutdown on the recovery system, backup the second application according to the second recipe to generate an application-consistent backup of the second application.

14. The system of claim 10 wherein the snapshot backup of the application comprises a backup of the application created while the application is running, and the application-consistent backup comprises a backup of the application created while the application is shutdown.

15. The system of claim 10 wherein the recipe specifies a set of metrics to be measured during a recovery of the application and the processor-based system is configured to:

obtain the application-consistent backup of the application;

recover the application-consistent backup of the application to the recovery system; and measure the recovery according to the set of metrics.

16. A computer program product, comprising a non-transitory computer-readable medium having a computer-readable program code embodied therein, the computer-readable program code adapted to be executed by one or more processors to implement a method comprising:

storing a recipe for an application, the recipe specifying parameters and actions for restoring the application, bringing the application into a consistent state, safely terminating the application, and backing up a validated consistent version of the application;

copying a snapshot backup of the application from a backup system to a recovery system, wherein the snapshot backup of the application on the backup system is a crash-consistent backup of the application;

restoring the application to the recovery system according to the recipe;

after the restoring the application, shutting down the application according to the recipe; and while the application is shutdown on the recovery system, backing up the application according to the recipe to create an application-consistent backup of the application.

17. The computer program product of claim 16 wherein the method comprises replacing the snapshot backup of the application on the backup system with the application-consistent backup of the application.

18. The computer program product of claim 16 wherein the method comprises:

before the shutting down the application, initiating and validating consistency of the restored application according to the recipe, the initiating and validating consistency comprising:

starting the application;

playing back logs against the application;

running one or more of checks or repairs on the application; and running application-specific procedures to check functional correctness of the application to safeguard against logical errors or data corruption.

19. The computer program product of claim 16 wherein the snapshot backup of the application comprises a backup of the application created while the application is running, and the application-consistent backup comprises a backup of the application created while the application is shutdown.

20. The computer program product of claim 16 wherein the recipe specifies a set of metrics to be measured during a recovery of the application and the method comprises:

obtaining the application-consistent backup of the application;

recovering the application-consistent backup of the application to the recovery system; and measuring the recovery according to the set of metrics.

* * * * *